US012739032B2

(12) United States Patent
Vinayachandran et al.

(10) Patent No.: US 12,739,032 B2
(45) Date of Patent: Sep. 15, 2026

(54) CALIBRATION APPARATUS, CALIBRATION METHOD, AND NON-TRANSITORY COMPUTER-READABLE STORAGE MEDIUM

(71) Applicant: NEC Corporation, Tokyo (JP)

(72) Inventors: Ankith Vinayachandran, Tokyo (JP); Shinsuke Fujisawa, Tokyo (JP); Naoto Ishii, Tokyo (JP); Hidemi Noguchi, Tokyo (JP); Emmanuel Le Taillandier De Gabory, Tokyo (JP)

(73) Assignee: NEC CORPORATION, Tokyo (JP)

( * ) Notice: Subject to any disclaimer, the term of this patent is extended or adjusted under 35 U.S.C. 154(b) by 236 days.

(21) Appl. No.: 18/726,472

(22) PCT Filed: Jan. 18, 2022

(86) PCT No.: PCT/JP2022/001646
§ 371 (c)(1),
(2) Date: Jul. 3, 2024

(87) PCT Pub. No.: WO2023/139658
PCT Pub. Date: Jul. 27, 2023

(65) Prior Publication Data
US 2025/0070877 A1 Feb. 27, 2025

(51) Int. Cl.
*H04B 10/588* (2013.01)
*H04B 10/2507* (2013.01)
(Continued)

(52) U.S. Cl.
CPC ......... *H04B 10/2507* (2013.01); *H04B 10/58* (2013.01); *H04B 10/60* (2013.01)

(58) Field of Classification Search
CPC .................................................... H04B 10/588
See application file for complete search history.

(56) References Cited

U.S. PATENT DOCUMENTS

2017/0170993 A1* 6/2017 Jia ..................... H04L 25/03006
2019/0393965 A1* 12/2019 Zhang ..................... H04L 27/36
2022/0173807 A1* 6/2022 Yamagishi ............. H04B 10/58

FOREIGN PATENT DOCUMENTS

EP 1855399 A1 11/2007
JP 2016-072942 A 5/2016
(Continued)

OTHER PUBLICATIONS

International Search Report for PCT Application No. PCT/JP2022/001646, mailed on Apr. 19, 2022.
(Continued)

*Primary Examiner* — Shi K Li
(74) *Attorney, Agent, or Firm* — Sughrue Mion, PLLC

(57) ABSTRACT

A calibration apparatus trains a first machine learning-based model with a first training dataset to determine configuration parameters of an intermediate pre-distortion compensator in an optical communication system that includes a transmitter, a receiver, and an optical communication channel. The transmitter includes a pre-distortion compensator, the intermediate pre-distortion compensator, and an MZM compensator. The calibration apparatus trains a second machine learning-based model with a second training dataset to determine configuration parameters of the post-distortion compensator in the receiver. The calibration apparatus trains a third machine learning-based model with a third training dataset to determine configuration parameters of the pre-distortion compensator. When generating the second training data, the intermediate pre-distortion compensator is configured with the configuration parameters generated using the first machine learning-based model. When generating the third training data, the post-distortion compensator is configured with the configuration parameters generated using the second machine learning-based model.

15 Claims, 11 Drawing Sheets

(51) Int. Cl.
*H04B 10/58* (2013.01)
*H04B 10/60* (2013.01)

(56) References Cited

FOREIGN PATENT DOCUMENTS

| | | | |
|---|---|---|---|
| JP | 2017-011463 | A | 1/2017 |
| WO | 2013/126150 | A1 | 8/2013 |
| WO | 2020/175014 | A1 | 9/2020 |

OTHER PUBLICATIONS

Written opinion for PCT Application No. PCT/JP2022/001646, mailed on Apr. 19, 2022.

* cited by examiner

CALIBRATION APPARATUS, CALIBRATION METHOD, AND NON-TRANSITORY COMPUTER-READABLE STORAGE MEDIUM

This application is a National Stage Entry of PCT/JP2022/001646 filed on Jan. 18, 2022, the contents of all of which are incorporated herein by reference, in their entirety.

TECHNICAL FIELD

The present disclosure generally relates to a calibration of optical communication systems.

BACKGROUND ART

In an optical communication system, messages are transmitted from a transmitter to a receiver through an optical communication channel such as an optical fiber medium. The transmitter and the receiver are formed with multiple hardware devices, and those devices introduce distortions into an optical signal.

The distortion included in the optical signal could cause misinterpretation of the messages at the receiver. Thus, methods are required to mitigate the distortion introduced in an optical communication system. For example, PLT1 discloses an optical communication system that has pre- and post-compensators.

CITATION LIST

Patent Literature

PTL1: EP Patent Publication No. EP1855399

SUMMARY OF INVENTION

Technical Problem

The system disclosed by PTL1 aims at compensating for residual dispersion introduced by the optical fiber. An objective of the present disclosure is to provide a novel technique to compensate for distortions introduced by a transceiver in optical communication systems.

Solution to Problem

The present disclosure provides a calibration apparatus that comprises at least one memory that is configured to store instructions and at least one processor. The processor is configured to execute the instructions to: train a first machine learning-based model with a first training dataset to determine configuration parameters of an intermediate pre-distortion compensator in an optical communication system that includes a transmitter, a receiver, and an optical communication channel, the transmitter including a pre-distortion compensator, the intermediate pre-distortion compensator, and a Mach Zehnder Modulator (MZM) compensator, the first training dataset including multiple pairs of: a first input data that represents a transmission symbol sequence representing a message to be sent; and a first ground-truth data that represents an inverse signal of distortion that is generated based on an output from an electrical path in the transmitter, the output from the electrical path being acquired by feeding the transmission symbol sequence to the transmitter in which the intermediate pre-distortion compensator and the MZM compensator are enabled while the pre-distortion compensator is disabled; train a second machine learning-based model with a second training dataset to determine configuration parameters of the post-distortion compensator included in the receiver, the second training dataset including multiple pairs of: a second input data that represents an output from an optical front end included in the receiver; and a second ground-truth data that represents the transmission symbol sequence, the output from the optical front end being acquired by feeding the transmission symbol sequence to the optical communication system in which the intermediate pre-distortion compensator, the MZM compensator, and the post-distortion compensator are enabled while the pre-distortion compensator is disabled and in which the configuration parameters determined using the first machine learning-based model are applied to the intermediate pre-distortion compensator; and train a third machine learning-based model with a third training dataset to determine configuration parameters of the pre-distortion compensator, the third training dataset including multiple pairs of: a third input data that represents the transmission symbol sequence; and a third ground-truth data that represents an inverse signal of distortion that is generated based on an output from the post-distortion compensator, the output from the post-distortion compensator being acquired by feeding the transmission symbol sequence to the optical communication system in which the pre-distortion compensator and the post-distortion compensator are enabled while the intermediate pre-distortion compensator and the MZM compensator are disabled and in which the configuration parameters determined using the second machine learning-based model are applied to the post-distortion compensator.

The present disclosure further provides a training method that is performed by a computer. The training method comprises: training a first machine learning-based model with a first training dataset to determine configuration parameters of an intermediate pre-distortion compensator in an optical communication system that includes a transmitter, a receiver, and an optical communication channel, the transmitter including a pre-distortion compensator, the intermediate pre-distortion compensator, and a Mach Zehnder Modulator (MZM) compensator, the first training dataset including multiple pairs of: a first input data that represents a transmission symbol sequence representing a message to be sent; and a first ground-truth data that represents an inverse signal of distortion that is generated based on an output from an electrical path in the transmitter, the output from the electrical path being acquired by feeding the transmission symbol sequence to the transmitter in which the intermediate pre-distortion compensator and the MZM compensator are enabled while the pre-distortion compensator is disabled; training a second machine learning-based model with a second training dataset to determine configuration parameters of the post-distortion compensator included in the receiver, the second training dataset including multiple pairs of: a second input data that represents an output from an optical front end included in the receiver; and a second ground-truth data that represents the transmission symbol sequence, the output from the optical front end being acquired by feeding the transmission symbol sequence to the optical communication system in which the intermediate pre-distortion compensator, the MZM compensator, and the post-distortion compensator are enabled while the pre-distortion compensator is disabled and in which the configuration parameters determined using the first machine learning-based model are applied to the intermediate pre-distortion compensator; and training a third machine learning-based model with a third training dataset to determine configuration parameters of the pre-distortion compensator, the third training dataset including multiple pairs of: a third input data that represents the transmission symbol sequence; and a third ground-truth data that represents an inverse signal of distortion that is generated based on an output from the post-distortion compensator, the output from the post-distortion compensator being acquired by feeding the transmission symbol sequence to the optical communication system in which the pre-distortion compensator and the post-distortion compensator are enabled while the intermediate pre-distortion compensator and the MZM compensator are disabled and in which the configuration parameters determined using the second machine learning-based model are applied to the post-distortion compensator.

The present disclosure further provides a non-transitory computer readable storage medium storing a program. The program that causes a computer to execute: training a first machine learning-based model with a first training dataset to determine configuration parameters of an intermediate pre-distortion compensator in an optical communication system that includes a transmitter, a receiver, and an optical communication channel, the transmitter including a pre-distortion compensator, the intermediate pre-distortion compensator, and a Mach Zehnder Modulator (MZM) compensator, the first training dataset including multiple pairs of: a first input data that represents a transmission symbol sequence representing a message to be sent; and a first ground-truth data that represents an inverse signal of distortion that is generated based on an output from an electrical path in the transmitter, the output from the electrical path being acquired by feeding the transmission symbol sequence to the transmitter in which the intermediate pre-distortion compensator and the MZM compensator are enabled while the pre-distortion compensator is disabled; training a second machine learning-based model with a second training dataset to determine configuration parameters of the post-distortion compensator included in the receiver, the second training dataset including multiple pairs of: a second input data that represents an output from an optical front end included in the receiver; and a second ground-truth data that represents the transmission symbol sequence, the output from the optical front end being acquired by feeding the transmission symbol sequence to the optical communication system in which the intermediate pre-distortion compensator, the MZM compensator, and the post-distortion compensator are enabled while the pre-distortion compensator is disabled and in which the configuration parameters determined using the first machine learning-based model are applied to the intermediate pre-distortion compensator; and training a third machine learning-based model with a third training dataset to determine configuration parameters of the pre-distortion compensator, the third training dataset including multiple pairs of: a third input data that represents the transmission symbol sequence; and a third ground-truth data that represents an inverse signal of distortion that is generated based on an output from the post-distortion compensator, the output from the post-distortion compensator being acquired by feeding the transmission symbol sequence to the optical communication system in which the pre-distortion compensator and the post-distortion compensator are enabled while the intermediate pre-distortion compensator and the MZM compensator are disabled and in which the configuration parameters determined using the second machine learning-based model are applied to the post-distortion compensator.

Advantageous Effects of Invention

According to the present disclosure, a novel technique to compensate for distortions introduced by a transmitter in optical communication systems is provided.

DESCRIPTION OF EMBODIMENTS

Example embodiments according to the present disclosure will be described hereinafter with reference to the drawings. The same numeral signs are assigned to the same elements throughout the drawings, and redundant explanations are omitted as necessary. In addition, predetermined information (e.g., a predetermined value or a predetermined threshold) is stored in advance in a storage device to which a computer using that information has access unless otherwise described.

First Example Embodiment

<Overview>

Figure 1:
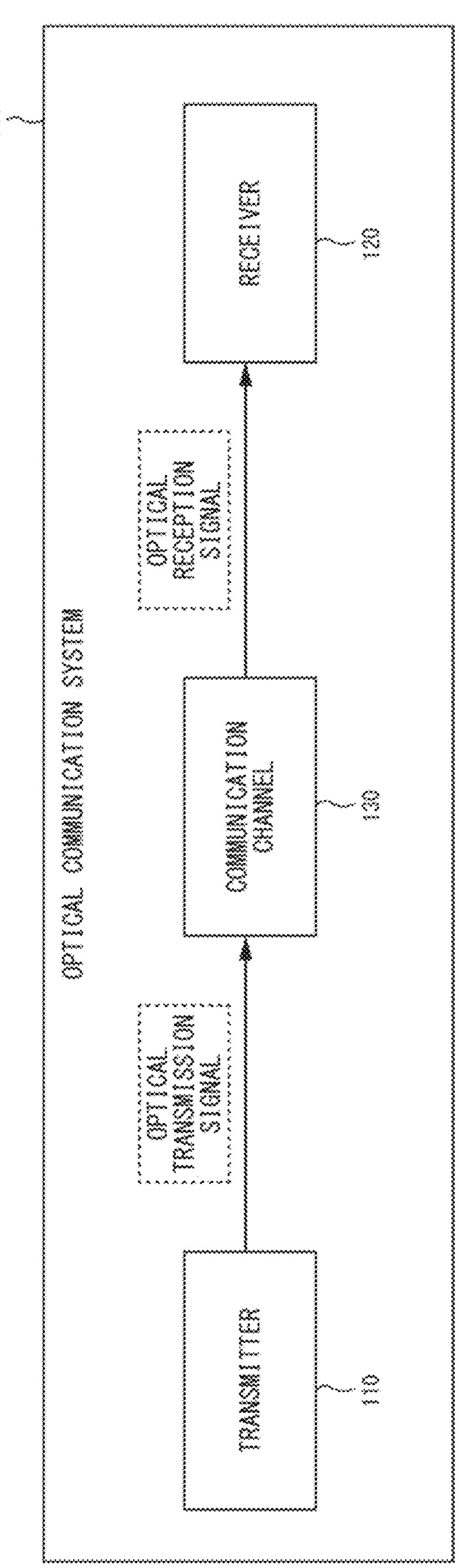
FIG. 1 illustrates an optical communication system for which the calibration apparatus of the first example embodiment is used.

FIG. 1 illustrates an optical communication system for which the calibration apparatus of the first example embodiment is used. The optical communication system 100 includes a transmitter 110, a receiver 120, and a communication channel 130. The transmitter 110 transmits an optical signal to the receiver 120 through the communication channel 130. The communication channel 130 may include an optical fiber through which the optical signal is transmitted from the transmitter 110 the receiver 120. Hereinafter, the optical signal transmitted from the transmitter 110 and that received by the receiver 120 are called "optical transmission signal" and "optical reception signal", respectively.

Figure 2:
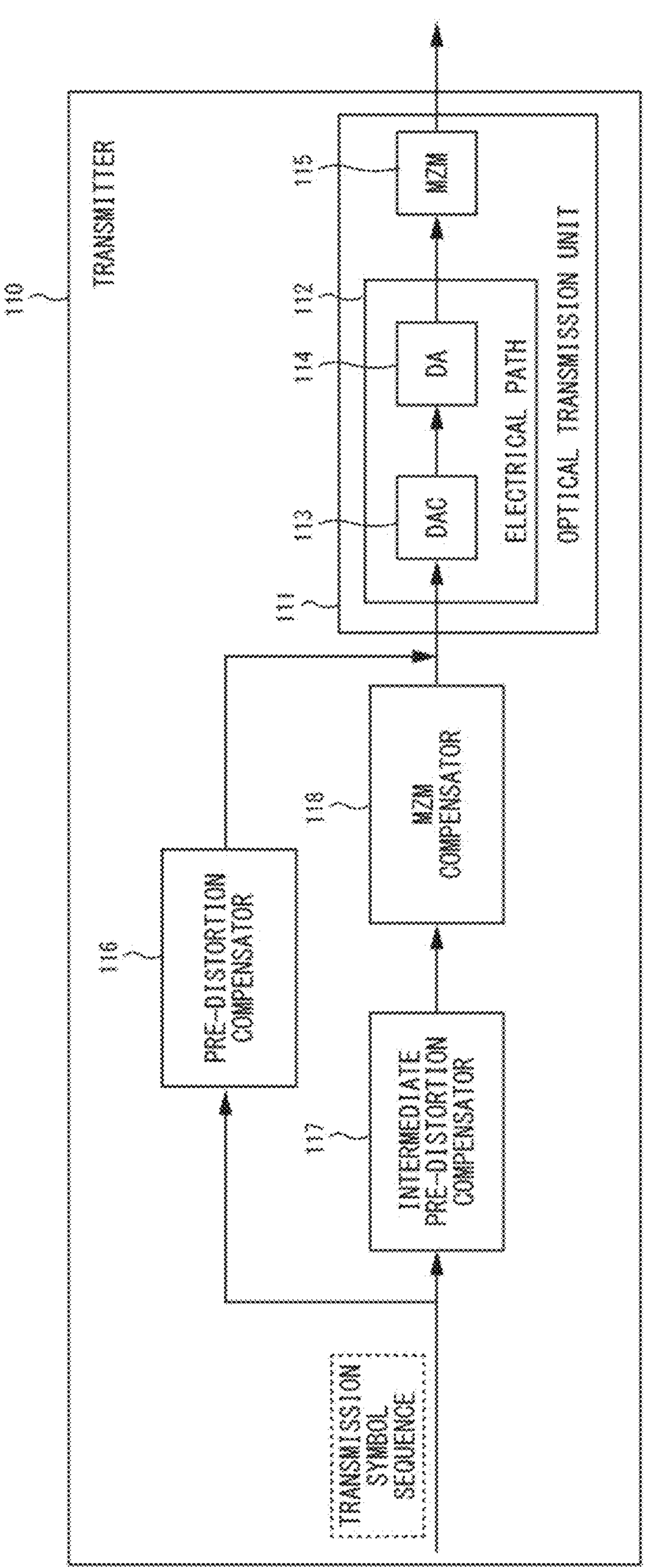
FIG. 2 illustrates an example structure of the transmitter.

FIG. 2 illustrates an example structure of the transmitter 110. The transmitter 110 includes an optical transmission unit 111 that acquires a transmission symbol sequence (more precisely, the transmission symbol sequence that is processed by pre-distortion compensator(s) as mentioned later), converts the transmission symbol sequence into the optical transmission signal, and transmits the optical transmission signal. The optical transmission unit 111 may comprise an electrical path 112 and a Mach Zehnder Modulator (MZM)

115. The electrical path 112 may include a digital-to-analog converter (DAC) 113 and a driving amplifier (DA) 114.

The transmission symbol sequence is a digital signal that represents a time series of symbols. The transmission symbol sequence is obtained as the result of encoding data (message, in other words) that is to be transmitted to the receiver 120. In the case where the optical communication system 100 is a single channel optical communication system with single polarization, each symbol includes the in-phase and quadrature-phase components. Thus, in this case, the transmission symbol sequence includes a set of the in-phase and quadrature-phase components for each point in time.

The transmitter 110 further includes distortion compensators that compensate for distortions that are introduced into the transmitted signal. Specifically, the transmitter 110 includes a pre-distortion compensator 116, an intermediate pre-distortion compensator 117, and a MZM compensator 118.

The pre-distortion compensator 116 is configured to compensate for distortions introduced by a whole of the optical transmission unit 111, and is used in an operation phase of the optical communication system 100. On the other hand, the intermediate pre-distortion compensator 117 and the MZM compensator 118 are configured to compensate for distortions introduced by parts of the optical transmission unit 111 different from each other, and are used for a calibration of the pre-distortion compensator 116. Specifically, the intermediate pre-distortion compensator 117 is configured to compensate for the distortions introduced by the electrical path 112 (e.g., the DAC 113 and the DA 114) whereas the MZM compensator 118 is configured to compensate for the distortions introduced by the MZM 115.

In some implementations, the MZM compensator 118 is located after the intermediate pre-distortion compensator 117 and before the transmission unit 110 as depicted by FIG. 1. In this case, the intermediate pre-distortion compensator 117 acquires the transmission symbol sequence, modifies it to compensate for the distortions, and outputs the modified transmission symbol sequence to the MZM compensator 118. Then, the MZM compensator 118 further modifies the acquired symbol sequence and outputs the result to the optical transmission unit 110.

However, the locations of the intermediate pre-distortion compensator 117 and the MZM compensator 118 may be switched. In this case, the MZM compensator 118 acquires the transmission symbol sequence, modifies it to compensate for the distortions, and outputs the modified transmission symbol sequence to the intermediate pre-distortion compensator 117. Hereinafter, unless otherwise mentioned, it is assumed that the intermediate pre-distortion compensator 117 and the MZM compensator 118 are located in the order illustrated by FIG. 1.

The pre-distortion compensator 116 is located in parallel with a set of the intermediate pre-distortion compensator 117 and the MZM compensator 118. When the pre-distortion compensator 116 is enabled, the intermediate pre-distortion compensator 117 and the MZM compensator 118 are disabled so that the transmission symbol sequence is processed by the pre-distortion compensator 116.

Figure 3:
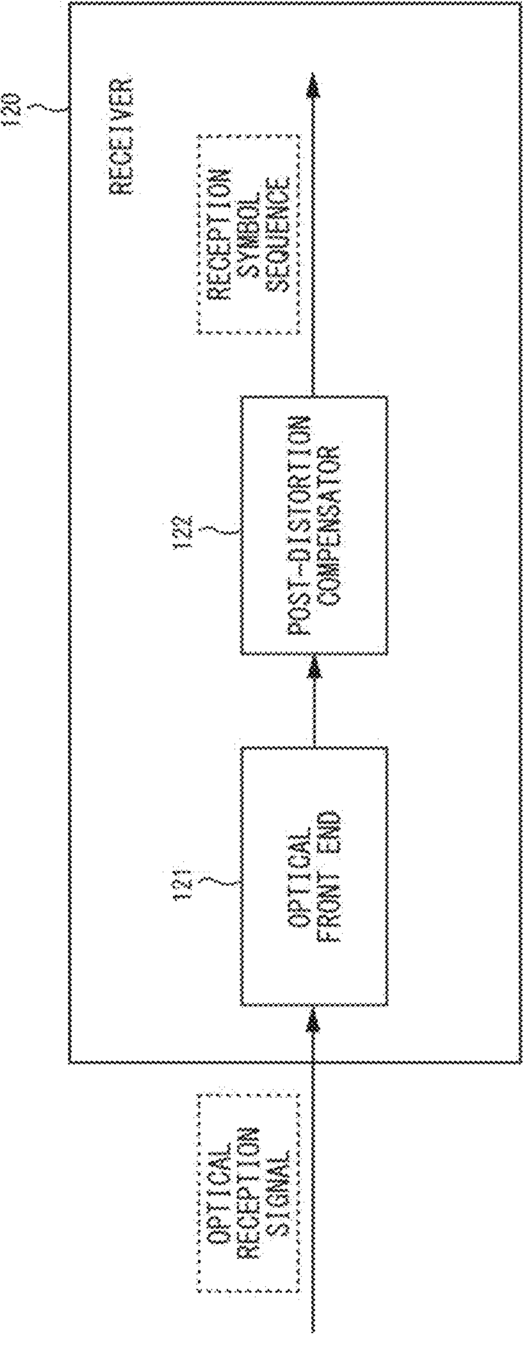
FIG. 3 illustrates an example structure of the receiver.

FIG. 3 illustrates an example structure of the receiver 120. The receiver 120 receives the optical reception signal from the communication channel 130, and converts the optical reception signal into a digital signal called "reception symbol sequence". The reception symbol sequence represents a time series of symbols by which the data transmitted by the transmitter 110 is represented.

The receiver 120 includes an optical front end (OFE) 121. The OFE 121 may include a local oscillator and demodulation function with which the optical reception signal is converted into an analog electronic signal. The OFE 121 may further comprise a recovery algorithm block to compensate various linear and clock recovery effects followed by an analog-to-digital converter (ADC). The ADC converts the analog electronic signal processed by the recovery algorithm block into the reception symbol sequence.

The receiver 120 further includes a post-distortion compensator 122 after the OFE 121. The post-distortion compensator 122 is configured to compensate for distortions introduced by the OFE 121, and is used in an operation phase of the optical communication system 100. The reception symbol sequence output from the OFE 121 is fed into the post-distortion compensator 122 and modified to compensate for the distortions.

Hereinafter, an overview of the calibration apparatus of the first example embodiment is explained. Note that the overview explained below is an example of operations of the calibration apparatus for making it easy to understand the calibration apparatus, and does not limit or narrow the scope of possible operations of the calibration apparatus.

The calibration apparatus is used for a calibration of the pre-distortion compensator 116. Specifically, the calibration apparatus determines configuration parameters of the pre-distortion compensator 116 in the calibration thereof so that the pre-distortion compensator 116 can compensate for the distortions introduced by the transmission unit 111 in the operation phase of the optical communication system.

It is noted that the calibration of the pre-distortion compensator 116 may be performed not only before the operation phase of the optical communication system 100 but also during the operation phase of the optical communication system 100. Hereinafter, the calibration performed before the operation phase of the optical communication system and that performed during the operation phase of the optical communication system 100 are called "offline calibration" and "online calibration", respectively. The online calibration is effective to update the configuration of the pre-distortion compensator 116 adjusting to changes in characteristics of the optical communication system 100 due to ageing and temperature, a replacement in the configuration of devices, etc.

In order for the calibration of the pre-distortion compensator 116, the calibration apparatus first determines configuration parameters of the intermediate pre-distortion compensator 117 using the MZM compensator 118. Then, the calibration apparatus determines configuration parameters of the post-distortion compensator 122 using the MZM compensator 118 and the intermediate pre-distortion compensator 117 to which the determined configuration parameters has been applied. Last, the calibration apparatus determines configuration parameters of the pre-distortion compensator 116 using the post-distortion compensator 122 to which the determined configuration parameters has been applied.

The calibration apparatus determines the configuration parameters of the intermediate pre-distortion compensator 117, the post-distortion compensator 122, and the pre-distortion compensator 116 using machine learning-based models, such as neural networks. Hereinafter, a machine learning-based model used to determine the configuration parameters of the intermediate pre-distortion compensator 117, that used to determine the configuration parameters of the post-distortion compensator 122, and that used to determine the configuration parameters of the pre-distortion compensator 116 are called "first model", "second model", and "third model", respectively.

The calibration apparatus acquires a first training dataset that is used to train the first model. The first training dataset is generated by feeding multiple transmission symbol sequences to the transmitter 110 in which the intermediate pre-distortion compensator 117 and the MZM compensator 118 are enabled while the pre-distortion compensator 116 is disabled. Then, the calibration apparatus trains the first model with the first training dataset, thereby determining the configuration parameters of the intermediate pre-distortion compensator 117.

It is noted that "components in a device or a system are enabled" means that the device or the system is configured so that signals to be processed are fed into those components and processed by them. On the other hand, "components in a device or a system are disabled" means that the device or the system is configured so that signals to be processed are not fed into those components: e.g., those components are removed from the optical communication system 100.

The calibration apparatus acquires a second training dataset that is used to train the second model. The second training dataset is generated by feeding multiple transmission symbol sequences to the optical communication system 100 in which the intermediate pre-distortion compensator 117, the MZM compensator 118, and the post-distortion compensator 122 are enabled while the pre-distortion compensator 116 is disabled. The configuration parameters that are generated through the training of the first model is applied to the intermediate pre-distortion compensator 117 when the optical communication system 100 is used to generate the second training dataset. Then, the calibration apparatus trains the second model with the second training dataset, thereby determining the configuration parameters of the post-distortion compensator 122.

The calibration apparatus acquires a third training dataset that is used to train the third model. The third training dataset is generated by feeding multiple transmission symbol sequences to the optical communication system 100 in which the pre-distortion compensator 116 and the post-distortion compensator 122 are enabled while the intermediate pre-distortion compensator 117 and the MZM compensator 118 are disabled. The configuration parameters that are generated through the training of the second model is applied to the post-distortion compensator 122 when the optical communication system 100 is used to generate the third training dataset. Then, the calibration apparatus trains the third model with the third training dataset, thereby determining the configuration parameters of the pre-distortion compensator 116.

<Example of Advantageous Effect>

The calibration apparatus 2000 is advantageous in that it can ensure that the separation of the pre and post compensation functions is accurate and optimal. Specifically, the calibration apparatus 2000 first determines the configuration parameters of the intermediate pre-distortion compensator 116 through the training of the first model, and then determines the configuration parameters of the post-distortion compensator 122 though the training of the second model. This allows accurate training of the post-compensation function performed by the post-distortion compensator 122. In addition, the calibration apparatus 2000 determines the configuration parameters of the pre-distortion compensator 116 through the training of the third model after the configuration parameters of the post-distortion compensator 122 are determined. This allows accurate training of the pre-compensation function performed by the pre-distortion compensator 116.

Hereinafter, more detailed explanation of the calibration apparatus 2000 will be described.

<Example of Functional Configuration>

Figure 4:
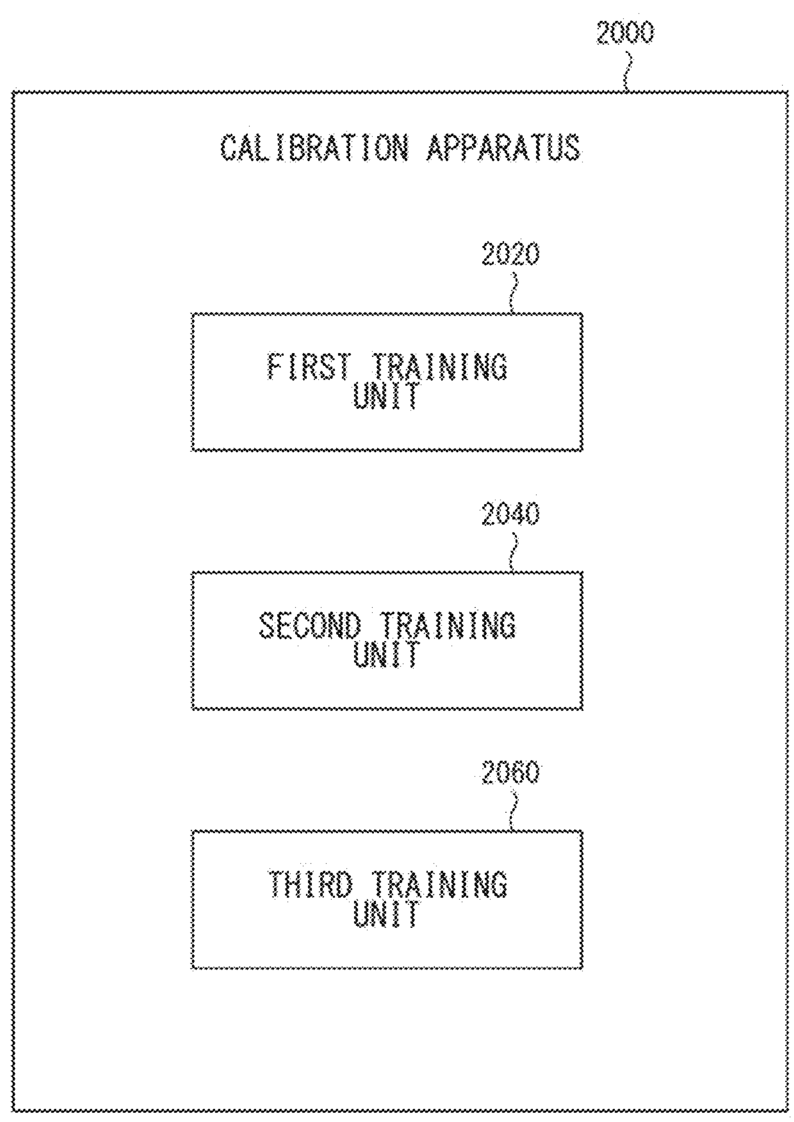
FIG. 4 is a block diagram illustrating an example of the functional configuration of the calibration apparatus.

FIG. 4 is a block diagram illustrating an example of the functional configuration of the calibration apparatus. The calibration apparatus 2000 includes a first training unit 2020, a second training unit 2040, and a third training unit 2060. The first training unit 2020 acquires the first training dataset and trains the first model with the first training dataset to determine the configuration parameters of the intermediate pre-distortion compensator 117. The second training unit 2040 acquires the second training dataset and trains the second model with the second training dataset to determine the configuration parameters of the post-distortion compensator 122. The third training unit 2080 acquires the third training dataset and trains the third model with the third training dataset to determine the configuration parameters of the pre-distortion compensator 116.

<Example of Hardware Configuration>

The calibration apparatus 2000 may be realized by one or more computers. Each of the one or more computers may be a special-purpose computer manufactured for implementing the calibration apparatus 2000, or may be a general-purpose computer like a personal computer (PC), a server machine, or a mobile device.

The calibration apparatus 2000 may be realized by installing an application in the computer. The application is implemented with a program that causes the computer to function as the calibration apparatus 2000. In other words, the program is an implementation of the functional units of the calibration apparatus 2000.

Figure 5:
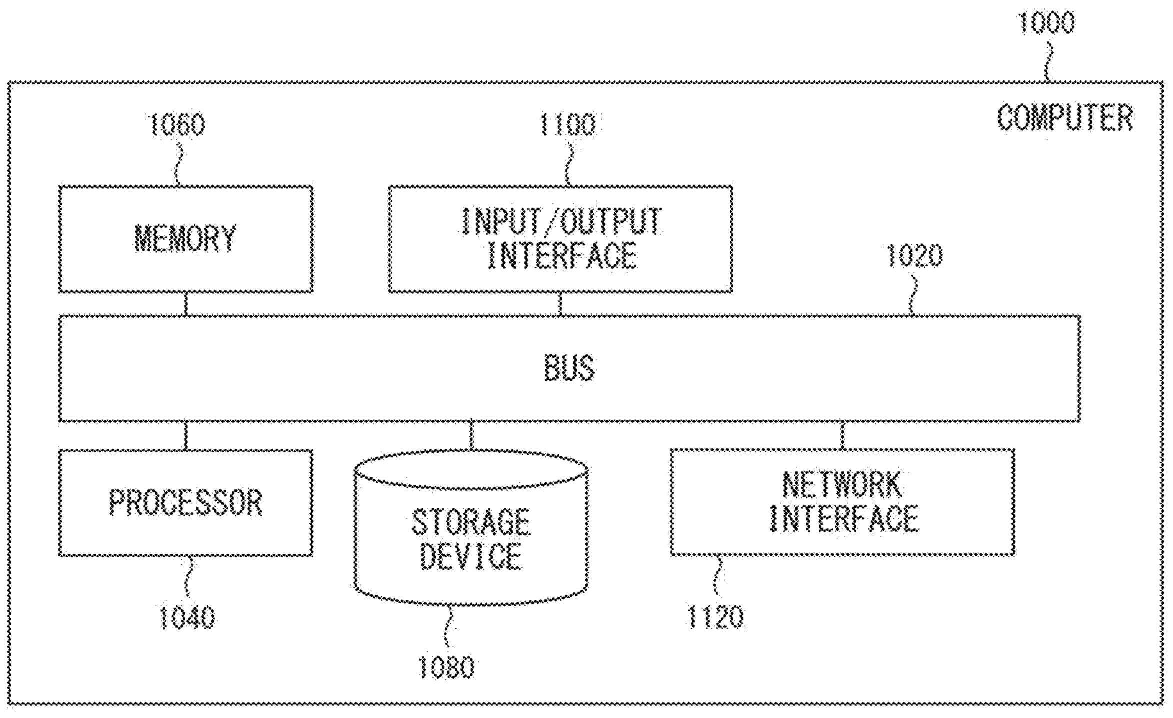
FIG. 5 is a block diagram illustrating an example of a hardware configuration of the calibration apparatus.

FIG. 5 is a block diagram illustrating an example of the hardware configuration of a computer 1000 realizing the calibration apparatus 2000. In FIG. 5, the computer 1000 includes a bus 1020, a processor 1040, a memory 1060, a storage device 1080, an input/output (I/O) interface 1100, and a network interface 1120.

The bus 1020 is a data transmission channel in order for the processor 1040, the memory 1060, the storage device 1080, and the I/O interface 1100, and the network interface 1120 to mutually transmit and receive data. The processor 1040 is a processer, such as a CPU (Central Processing Unit), GPU (Graphics Processing Unit), or FPGA (Field-Programmable Gate Array). The memory 1060 is a primary memory component, such as a RAM (Random Access Memory) or a ROM (Read Only Memory). The storage device 1080 is a secondary memory component, such as a hard disk, an SSD (Solid State Drive), or a memory card. The I/O interface 1100 is an interface between the computer 1000 and peripheral devices, such as a keyboard, mouse, or display device. The network interface 1120 is an interface between the computer 1000 and a network. The network may be a LAN (Local Area Network) or a WAN (Wide Area Network). The CPU 1040 executes the program to realize each functional unit of the calibration apparatus 2000.

The hardware configuration of the computer 1000 is not restricted to that shown in FIG. 5. For example, as mentioned-above, the calibration apparatus 2000 may be realized by plural computers. In this case, those computers may be connected with each other through the network.

<Flow of Process>

Figure 6:
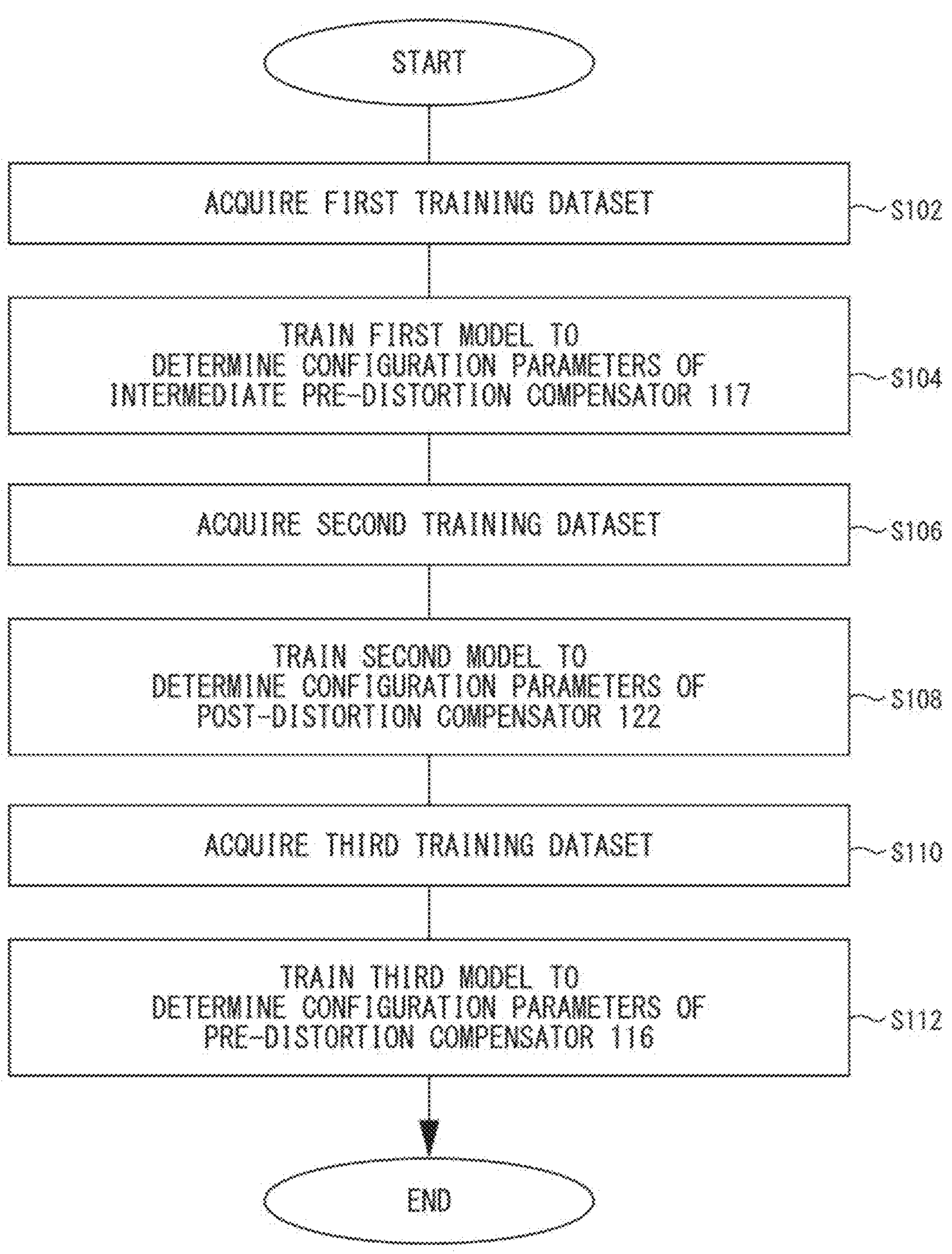
FIG. 6 is a flowchart illustrating an example flow of processes performed by the calibration apparatus.

FIG. 6 is a flowchart illustrating an example flow of processes performed by the calibration apparatus 2000. The first training unit 2020 acquires the first training dataset (S102) The first training unit 2020 trains the first model to determine the configuration parameters of the intermediate pre-distortion compensator 117 (S104). The second training unit 2040 acquires the second training dataset (S106). The second training unit 2040 trains the second model to determine the configuration parameters of the post-distortion compensator 122 (S108). The third training unit 2060 acquires the third training dataset (S110). The third training unit 2080 trains the third model to determine the configuration parameters of the pre-distortion compensator 116 (S112).

<Acquisition of First Training Dataset: S102>

The first training unit 2020 acquires the first training dataset that is used to train the first model (S102). The first training dataset may be generated by the calibration apparatus 2000 or may be another computer. Unless otherwise stated, it is assumed that the first training unit 2020 generates the first training dataset hereinafter.

Figure 7:
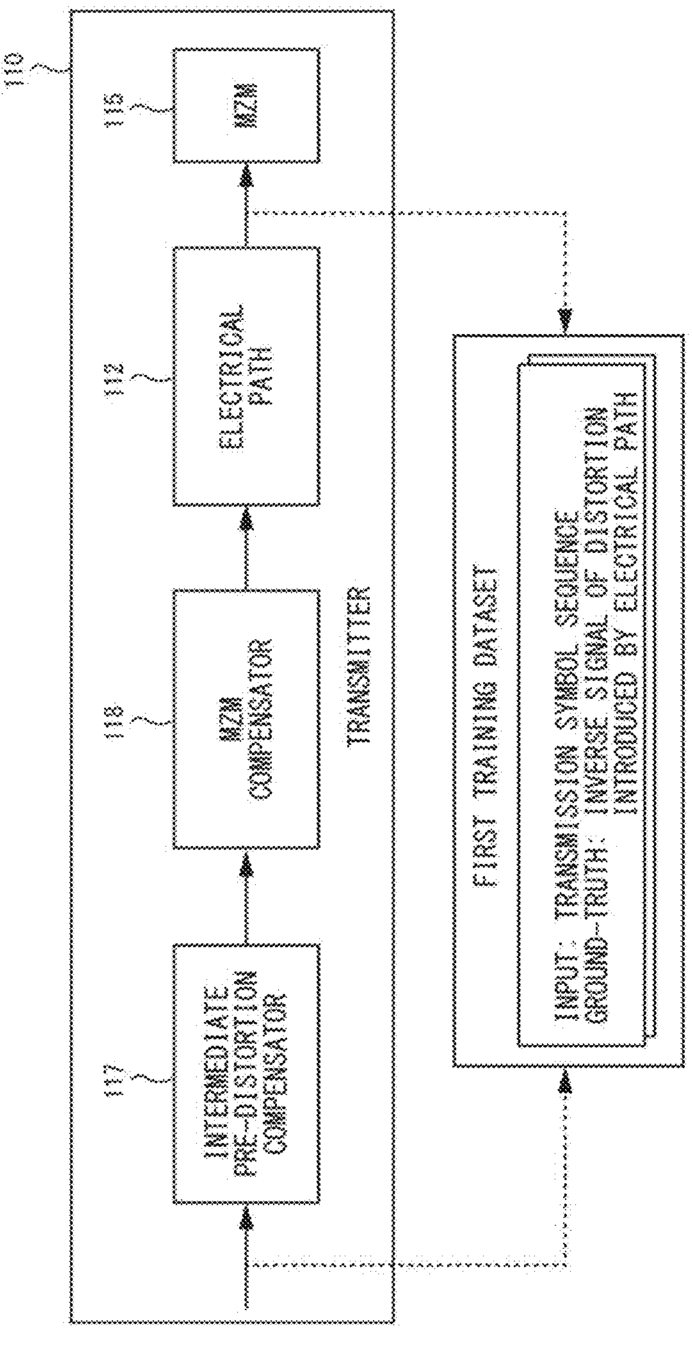
FIG. 7 illustrates a way of generating the first training dataset.

FIG. 7 illustrates a way of generating the first training dataset. As illustrated by FIG. 7, the intermediate pre-distortion compensator 117 and the MZM compensator 118 are enabled while the pre-distortion compensator 116 is disabled, when the transmitter 110 is used to generate the first training dataset.

The first training dataset includes multiple pairs of an input data and a ground-truth data. The first training dataset is generated such that the conversion of the input data to the ground-truth data is substantially equivalent to the compensation of the distortion introduced by the electrical path 112. Thus, the first training unit 2020 uses the transmission symbol sequence as the input data of the first training dataset. The transmission symbol sequence may be obtained in various ways. For example, the transmission symbol sequence may be stored in advance in a storage device to which the calibration apparatus 2000 has access. In this case, the first training unit 2020 obtains the transmission symbol sequence from the storage device. The obtained transmission symbol sequence may also be used to generate the second and third training dataset.

In order to generate the ground-truth data, the first training unit 2020 feeds the transmission symbol sequence to the transmitter 110 and obtains an output from the electrical path 112. Then, the obtained output is converted into a digital signal, and the first training unit 2020 uses the acquired digital signal to generate an inverse signal of the distortion introduced by the electrical path 112. This inverse signal is used as the ground-truth data of the first training dataset.

The inverse signal may be generated using the following equation: Equation 1

$$S_{inverse} = S_{input} - \lambda * (\mu * S_{output} - S_{input}) \qquad (1)$$

wherein S_inverse represents the inverse signal of the distortion introduced by the electrical path 112; S_input represents the transmission symbol sequence; S_output represents the digital signal that is obtained by converting the output from the electrical path 112 into a digital form; λ represents a factor to introduce additional scaling on the distortion (Typically set to 1); and u represents the scaling to account for the gain from the transmitter setup.

Since the MZM compensator 118 is used to generate the first training dataset, it is necessary to configure the MZM compensator 118 before the generation of the first training dataset. There are various well-known techniques to compensate the distortion effects introduced by a Mach Zehnder Modulator, and one of such techniques can be employed to configure the MZM compensator 118.

For example, the MZM compensator 118 may be configured through the arc sine method. This method may involve first utilizing a clipping function to limit the signal amplitude followed by an arc sine function in order to make the MZM 115 response linear. Specifically, the MZM compensator 118 may be configured to modify the input signal based on the following equation:

Equation 2

$$V_{out} = 2V_{pi} * \frac{\sin^{-1}(V_{in})}{\pi} \qquad (2)$$

Where V_out represents the voltage of the signal output from the MZM compensator 118; V_pi represents the bias voltage of the MZM 115; V_in represents the voltage of the signal input to the MZM compensator 118.

<Training of First Model: S104>

The first training unit 2020 trains the first model to determine the configuration parameters of the intermediate pre-distortion compensator 117 (S104). There are various well-known techniques to train a machine learning-based model using a training dataset, and one of those techniques may be employed to train the first model. For example, for each pair in the first training dataset, the first training unit 2020 inputs the input data of the pair to the first model, obtains an output from the first model, computes a loss by applying the ground-truth data and the output from the first model to a pre-defined loss function, and updates trainable parameters of the first model based on the computed loss.

After the completion of the training of the first model, the first training unit 2020 obtains the trainable parameters of the first model and uses them as the configuration parameters of the intermediate pre-distortion compensator 117. In the case where the first model is a neural network, the trainable parameters thereof may be weights assigned to connections between nodes.

Figure 8:
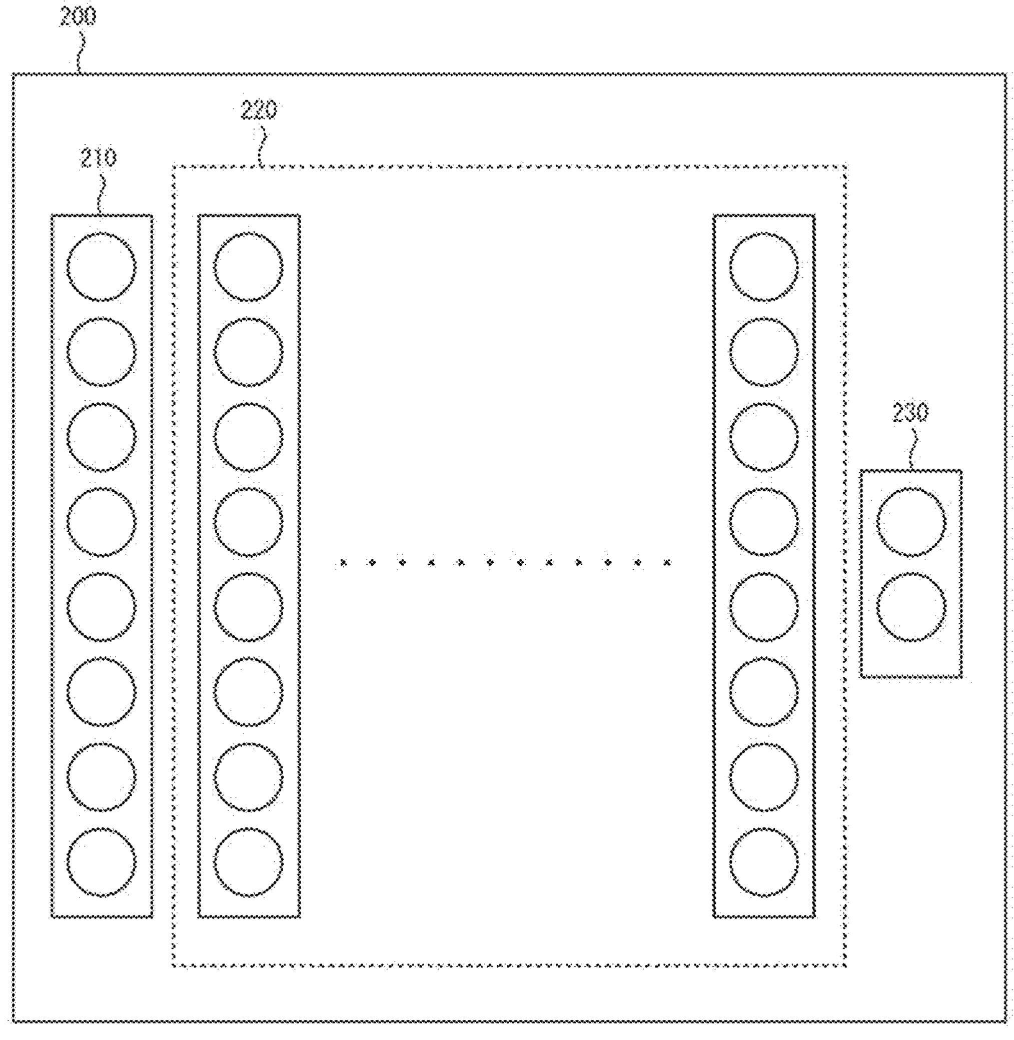
FIG. 8 illustrates an example structure of the first model.

FIG. 8 illustrates an example structure of the first model. In FIG. 8, the first model is implemented as a network 200. The network 200 includes an input layer 210, a hidden layer 210, and an output layer 230. It is noted that, for purpose of brevity, the edges between the layers are not depicted in FIG. 8.

The input layer 210 takes an input to the network 200. It is preferable that not only a single transmission symbol sequence but also past and future transmission symbol sequences of sufficient duration and polarization are input to the input layer 210. In this case, the input data of the first training data may include not a single but multiple consecutive transmission symbol sequences. The hidden layer 220 includes an appropriate number of layers which utilize activations of linear and non-linear characteristics. The output layer 230 is the last layer of the network 200 where the dimensions are expected to be matched to that required at the output of the intermediate pre-distortion compensator 117. There may also be additional skip connections introduced between the layers in the hidden layer 220 which aids in learning of the appropriate compensating functions.

<Acquisition of Second Training Dataset: S106>

The second training unit 2040 acquires the second training dataset that is used to train the second model (S106). Like the first training dataset, the second training dataset may be generated by the calibration apparatus 2000 or may be another computer. Unless otherwise stated, it is assumed that the second training unit 2040 generates the second training dataset hereinafter.

Figure 9:
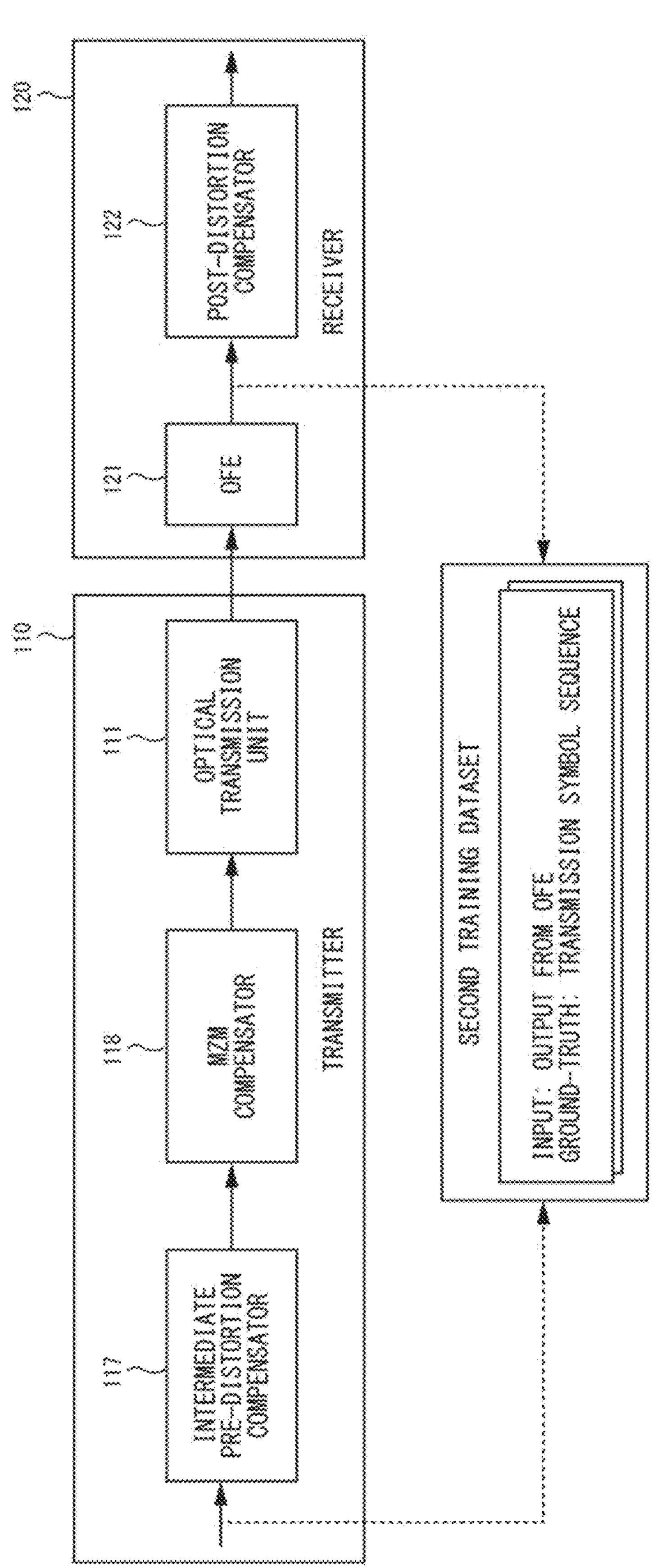
FIG. 9 illustrates a way of generating the second training dataset.

FIG. 9 illustrates a way of generating the second training dataset. As illustrated by FIG. 9, the intermediate pre-distortion compensator 117, the MZM compensator 118, and the post-distortion compensator 122 are enabled while the pre-distortion compensator 116 is disabled, when the optical communication system 100 is used to generate the second training dataset. The configuration parameters determined by the first training unit 2020 are applied to the intermediate pre-distortion compensator 117.

It is noted that, in the case of the offline calibration, it is preferable to connect the transmitter 110 and the receiver 120 back-to-back (i.e., connect them directly without the communication channel 130) when generating the second training dataset. The same applies to the generation of the third training dataset in the offline calibration.

The second training dataset includes multiple pairs of an input data and a ground-truth data. The second training unit 2040 feeds the transmission symbol sequence to the optical communication system 100 to obtain the data to be included in the second training dataset. Since the output from the OFE 121 should be equivalent to the transmission symbol sequence (i.e., an input to the pre-distortion compensators), the second model is trained so as to convert the output from the OFE 121 into a symbol sequence equivalent to the transmission symbol sequence. Thus, the second training unit 2040 obtains an output from the OFE 121 in response to the transmission symbol sequence being input to the optical communication system 100, and uses this data as the input data of the second training dataset. In addition, the second training unit 2040 uses the transmission symbol sequence that is input to the intermediate pre-distortion compensator 117 as the ground-truth data.

<Training of Second Model: S108>

The second training unit 2040 trains the second model with the second training dataset to determine the configuration parameters of the post-distortion compensator 122 (S108). After the completion of the training of the second model, the second training unit 2040 obtains the trainable parameters of the second model and uses them as the configuration parameters of the post-distortion compensator 122. In the case where the second model is a neural network, the trainable parameters thereof may be weights assigned to connections between nodes.

The way of training the second model with the second training dataset may be the same as the way of training the first model with the first training dataset. In addition, the structure of the second model may be the same as that of the first model. However, the hyperparameters, such as the number of layers, of the second model may be configured independently of the first model.

<Acquisition of Third Training Dataset: S110>

The third training unit 2060 acquires the third training dataset that is used to train the third model (S110). Like the first and second training dataset, the third training dataset may be generated by the calibration apparatus 2000 or may be another computer. Unless otherwise stated, it is assumed that the third training unit 2060 generates the third training dataset hereinafter.

Figure 10:
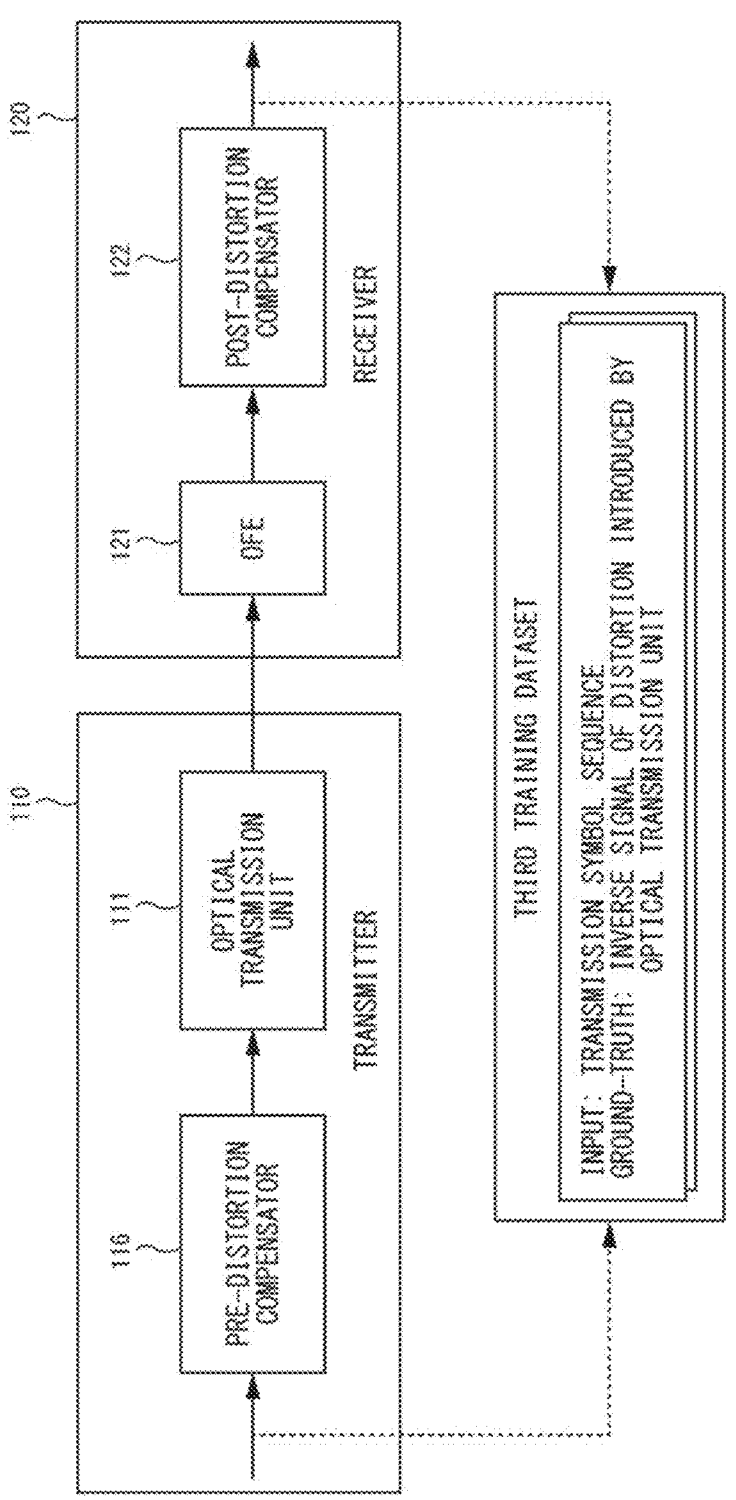
FIG. 10 illustrates a way of generating the third training dataset.

FIG. 10 illustrates a way of generating the third training dataset. As illustrated by FIG. 10, the pre-distortion compensator 116 and the post-distortion compensator 122 are enabled while the intermediate pre-distortion compensator 117 and the MZM compensator 118 are disabled, when the optical communication system 100 is used to generate the second training dataset. The configuration parameters determined by the second training unit 2040 are applied to the post-distortion compensator 122.

The third training dataset includes multiple pairs of an input data and a ground-truth data. The third training dataset is generated such that the conversion of the input data to the ground-truth data is substantially equivalent to the compensation of the distortion introduced by the optical transmission unit 111. Thus, the third training unit 2080 uses the transmission symbol sequence as the input data of the third training dataset. In addition, the third training unit 2080 feeds this transmission symbol sequence to the optical communication system 100 and obtains an output from the OFE 121, i.e., the reception symbol sequence. Then, the third training unit 2060 uses the reception symbol sequence to generate an inverse signal of the distortion introduced by the optical transmission unit 111, and uses the obtained signal as the ground-truth data of the third training dataset. The inverse signal may be generated using the equation (2) explained above. The output from the OFE 121 is assigned to S_output in this case.

<Training of Third Model: S112>

The third training unit 2080 trains the third model with the third training dataset to determine the configuration parameters of the pre-distortion compensator 116 (S112). After the completion of the training of the third model, the third training unit 2060 obtains the trainable parameters of the third model and uses them as the configuration parameters of the pre-distortion compensator 116. In the case where the third model is a neural network, the trainable parameters thereof may be weights assigned to connections between nodes.

The way of training the third model with the third training dataset may be the same as the way of training the first model with the first training dataset. In addition, the structure of the third model may be the same as that of the first model. However, the hyperparameters of the third model may be configured independently of the first model.

<Output from Calibration Apparatus>

The calibration apparatus 2000 may output information, called "parameter information", that describes the result of the calibration. The parameter information includes the configuration parameters of the pre-distortion compensator 116 that are determined by the third training unit 2060. Since the post-distortion compensator 122 is also used in the operation phase of the optical communication system 100, it is preferable that the parameter information also includes the configuration parameters of the post-distortion compensator 122 that are determined by the second training unit 2040.

There may be various ways of outputting the parameter information. For example, the parameter information is put into a storage device to which the calibration apparatus 2000 has access. In another example, the parameter information is sent to another computer, such as one performs configuration of the optical communication system 100.

<Example of Overall Flow of Calibrations>

As mentioned above, both the offline calibration and the online calibration may be performed. Hereinafter, an example of an overall flow of the offline and online calibrations performed by the calibration apparatus 2000.

Figure 11:
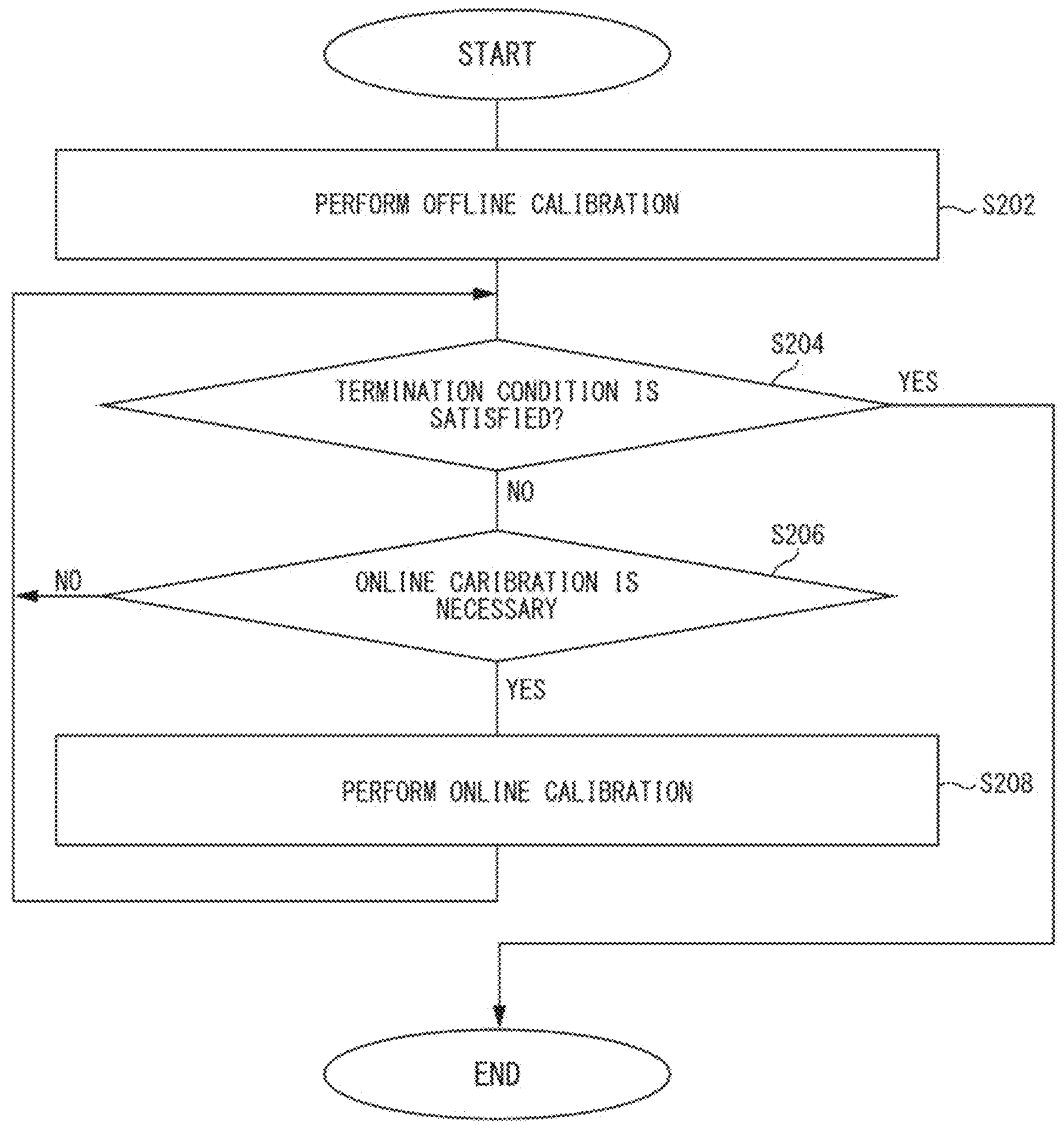
FIG. 11 illustrates an example of an overall flow of the offline and online calibrations performed by the calibration apparatus.

FIG. 11 illustrates an example of an overall flow of the offline and online calibrations performed by the calibration apparatus 2000. The calibration apparatus 2000 first performs an offline calibration of the pre-distortion compensator 116 and the post-distortion compensator 122 (S202).

After the optical communication system 100 transits to the operation phase, the calibration apparatus 2000 repeatedly performs the online calibration as needed until a pre-defined termination condition is satisfied. The termination condition may be arbitrary condition, such as "the operation of the optical communication system 100 is terminated".

The calibration apparatus 2000 determines whether or not the termination condition is satisfied. When the termination condition is satisfied (S204: YES), the process illustrated by FIG. 11 is terminated. On the other hand, when the termination condition is not satisfied (S204: NO), the calibration apparatus 2000 determines whether or not the online calibration is necessary (S206).

When the online calibration is necessary (S206: YES), the calibration apparatus 2000 performs the online calibration of the pre-distortion compensator 116 and the post-distortion compensator 122 (S208). As a result, the configuration parameters of the pre-distortion compensator 116 and the post-distortion compensator 122 are updated. On the other hand, the online calibration is not necessary (S206: NO), Step S204 is performed again. It is noted that some length of interval may be inserted before or after Step S204.

In order to determine whether or not the online calibration is necessary, the performance of the optical communication system 100 may be monitored, and the calibration apparatus 2000 may determine that the online calibration is necessary when the deterioration of the performance of the optical communication system 100 exceeds a permissible threshold. There are various metrices to measure the performance of the optical communication system 100, and one or more of those metrics can be employed. Examples of those metrics include a system capacity, Q-factor, etc.

It is noted that, since some of the new distortion characteristics introduced in the online optical communication system 100 may be of saturation type which are easier to compensate as pre-compensation function, it is preferable to perform the online calibration training in a different way from the way of the offline calibration: the configuration parameters of the pre-distortion compensator 116 are updated first, then those of the post-distortion compensator are updated. In addition, the intermediate pre-distortion compensator 117 and the MZM compensator 118 may be not used in the online calibration.

Specifically, the third training unit 2080 obtains the third training dataset from the optical communication system 100 in which the pre-distortion compensator 116 and the post-distortion compensator 122 are enabled while the intermediate pre-distortion compensator 117 and the MZM compensator 118 are disabled. Then, the third training unit 2080 trains the third model to determine new configuration parameters of the pre-distortion compensator 116. After applying the new configuration parameters to the pre-distortion compensator 116, the second training unit 2060 obtains the second training dataset from the optical communication system 100 in which the pre-distortion compensator 116 and the post-distortion compensator 122 are enabled while the intermediate pre-distortion compensator 117 and the MZM compensator 118 are disabled. Then, the second training unit 2060 trains the second model to determine new configuration parameters of the post-distortion compensator 122. The post-distortion compensator 122 is updated with the new configuration parameters.

Online calibration explained above is effective in various ways. First, the online calibration by the calibration apparatus 2000 ensures that the pre-distortion compensator 116 and the post-distortion compensator 122 can be updated to accurately compensate the changing distortion characteristics. The reason for the effect is that the pre-distortion compensator 116 and the post-distortion compensator 122 are updated based on pre-decided triggers in the presence of the optical communication channel 130 so that the accuracy of those compensators is maintained by the online calibration.

Second, the online calibration by the calibration apparatus 2000 ensures that the compensators are updated without changing the operating condition of the optical communication system 100. The reason for this effect is that the separate learning of the transmitter and the receiver distortions does not require additional intermediate devices such as intermediate complete transmission and reception devices with ideal characteristics to be introduced into the optical communication system 100 since same pair of the transmitter and the receiver are connected in back-to-back setting in the offline calibration. All learning takes on the actual transmitter and the receiver to be used in the operation phase with the optical communication channel 130.

The calibration apparatus 2000 is further effective in a scenario where any equipment which constitute the transmitter 110 or the receiver 120 is changed. The methodology employed in the calibration apparatus 2000 allows quicker calibrations in this scenario since the separation of the compensation function is directly possible.

Suppose that one or more pieces of the equipment of the transmitter 110 is changed. In this case, although the configuration of the pre-distortion compensator 116 is no longer appropriate, the configuration of the post-distortion compensator 122 is still effective. Thus, the calibration apparatus 2000 can perform an online calibration to update the configuration parameters of the pre-distortion compensator 116 through the training of the third model without training the second model.

Similarly, suppose that one or more pieces of the equipment of the receiver 120 is changed. In this case, although the configuration of the post-distortion compensator 122 is no longer appropriate, the configuration of the pre-distortion compensator 116 is still effective. Thus, the calibration apparatus 2000 can update the configuration of the post-distortion compensator 122 through the training of the second model without training the third model.

<Example of Theoretical Explanations>

Theoretically, the reception symbol sequence without compensations may be represented as follows:

Equation 3

$$y = f_{Rx}(f_{Ch}(f_{Tx}(x))) + \text{noise} \tag{3}$$

wherein y represents the reception symbol sequence; f_Rx( ) represents a model of distortions introduced by the OEF 121; f_ch( ) represents a model of distortions introduced by the optical communication channel 130; f_Tx( ) represents a model of distortions introduced by the optical transmission unit 111; and x represents the transmission symbol sequence.

Based on the above equation (3), it is preferable for the optical communication system 100 to compensate for the distortions modeled by f_Tx( ) f_Rx, and f_Ch. Regarding the optical communication system 100 with functions compensating for the distortions modeled by f_Tx( ) f_Rx, and f_Ch, the reception symbol sequence can be represented as follows:

Equation 4

$$y = f_{Rx}(f_{Ch}(f_{Tx}(x - g_{Tx}(x)))) - g_{Ch}(x^*) - g_{Rx}(x^*) + \text{noise} \quad (4)$$

wherein g_Tx( ) represents a model of compensation for the distortions introduced by the optical transmission unit 111; g_Ch( ) represents a model of compensation for the distortions introduced by the optical communication channel 130; g_Rx( ) represents a model of compensation for the distortions introduced by the OFE 121; and x^* represents an output from the OFE 121 (in other words, an estimated version of the transmission symbol sequence).

The calibration apparatus 2000 performs the calibration of the pre-distortion compensator 116 and the post-distortion compensator 122 so that they compensate for the distortions modeled by f_Tx( ) and f_Rx, respectively. In other words, the calibration of the pre-distortion compensator 116 and the post-distortion compensator 122 are aimed at configuring them to function as g_Tx( ) and g_Rx( ) respectively.

It is preferable that the optical communication system 100 also includes a compensator (called channel compensator, hereinafter) that functions as g_Ch( ) to compensate for the distortion modeled by f_Ch. There are various well-known techniques to compensate for the distortions introduced by an optical communication channel, and any one or more of those techniques can be employed to configure the channel compensator. It is noted that the channel compensator may be located between the OFE 121 and the post-distortion compensator 122.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Although the present disclosure is explained above with reference to example embodiments, the present disclosure is not limited to the above-described example embodiments. Various modifications that can be understood by those skilled in the art can be made to the configuration and details of the present disclosure within the scope of the invention.

The whole or part of the example embodiments disclosed above can be described as, but not limited to, the following supplementary notes.

<Supplementary Notes>

(Supplementary Note 1)

A calibration apparatus comprising:

at least one memory that is configured to store instructions; and at least one processor that is configured to execute the instructions to:

train a first machine learning-based model with a first training dataset to determine configuration parameters of an intermediate pre-distortion compensator in an optical communication system that includes a transmitter, a receiver, and an optical communication channel, the transmitter including a pre-distortion compensator, the intermediate pre-distortion compensator, and a Mach Zehnder Modulator (MZM) compensator, the first training dataset including multiple pairs of: a first input data that represents a transmission symbol sequence representing a message to be sent; and a first ground-truth data that represents an inverse signal of distortion that is generated based on an output from an electrical path in the transmitter, the output from the electrical path being acquired by feeding the transmission symbol sequence to the transmitter in which the intermediate pre-distortion compensator and the MZM compensator are enabled while the pre-distortion compensator is disabled;

train a second machine learning-based model with a second training dataset to determine configuration parameters of the post-distortion compensator included in the receiver, the second training dataset including multiple pairs of: a second input data that represents an output from an optical front end included in the receiver; and a second ground-truth data that represents the transmission symbol sequence, the output from the optical front end being acquired by feeding the transmission symbol sequence to the optical communication system in which the intermediate pre-distortion compensator, the MZM compensator, and the post-distortion compensator are enabled while the pre-distortion compensator is disabled and in which the configuration parameters determined using the first machine learning-based model are applied to the intermediate pre-distortion compensator; and train a third machine learning-based model with a third training dataset to determine configuration parameters of the pre-distortion compensator, the third training dataset including multiple pairs of: a third input data that represents the transmission symbol sequence; and a third ground-truth data that represents an inverse signal of distortion that is generated based on an output from the post-distortion compensator, the output from the post-distortion compensator being acquired by feeding the transmission symbol sequence to the optical communication system in which the pre-distortion compensator and the post-distortion compensator are enabled while the intermediate pre-distortion compensator and the MZM compensator are disabled and in which the configuration parameters determined using the second machine learning-based model are applied to the post-distortion compensator.

(Supplementary Note 2)

The calibration apparatus according to supplementary note 1, wherein the transmitter and the receiver are connected back-to-back when the transmission symbol sequence is fed in to the optical communication system to generate the second training data and the third training data.

(Supplementary Note 3)

The calibration apparatus according to supplementary note 1 or 2, wherein one or more of trainable parameters of the first machine learning-based model are used as the configuration parameters of the intermediate pre-distortion compensator, one or more of trainable parameters of the second machine learning-based model are used as the configuration parameters of the post-distortion compensator, and one or more of trainable parameters of the third machine learning-based model are used as the configuration parameters of the pre-distortion compensator.

(Supplementary Note 4)

The calibration apparatus according to any one of supplementary notes 1 to 3, wherein the at least one processor is configured to execute the instructions further to:

determine whether or not an update of a configuration of the optical communication system is necessary after the optical communication system transits to an operation phase; and update the configuration of the optical communication system when it is determined that the update of the configuration of the optical communication system is necessary, the update of the configuration of the optical communication system includes training the third machine learning-based model with the third training dataset to re-determine the configuration parameters of the pre-distortion compensator, the output from the post-distortion compensator to be used to generate the third ground-truth data being acquired by feeding the transmission symbol sequence to the optical communication system in which the pre-distortion compensator and the post-distortion compensator are enabled while the intermediate pre-distortion compensator and the MZM compensator are disabled and in which the transmitter and the receiver are connected through the optical communication channel.

(Supplementary Note 5)

The calibration apparatus according to supplementary note 4, wherein the update of the configuration of the optical communication system further includes training the second machine learning-based model with the second training dataset to re-determine the configuration parameters of the post-distortion compensator, the output from the optical front end to be used to generate the second ground-truth data being acquired by feeding the transmission symbol sequence to the optical communication system in which the pre-distortion compensator and the post-distortion compensator are enabled while the intermediate pre-distortion compensator and the MZM compensator are disabled, in which the transmitter and the receiver are connected through the optical communication channel, and in which the configuration parameters re-determined using the third machine learning-based model are applied to the pre-distortion compensator.

(Supplementary Note 6)

A calibration method performed by a computer, comprising:

training a first machine learning-based model with a first training dataset to determine configuration parameters of an intermediate pre-distortion compensator in an optical communication system that includes a transmitter, a receiver, and an optical communication channel, the transmitter including a pre-distortion compensator, the intermediate pre-distortion compensator, and a Mach Zehnder Modulator (MZM) compensator, the first training dataset including multiple pairs of: a first input data that represents a transmission symbol sequence representing a message to be sent; and a first ground-truth data that represents an inverse signal of distortion that is generated based on an output from an electrical path in the transmitter, the output from the electrical path being acquired by feeding the transmission symbol sequence to the transmitter in which the intermediate pre-distortion compensator and the MZM compensator are enabled while the pre-distortion compensator is disabled;

training a second machine learning-based model with a second training dataset to determine configuration parameters of the post-distortion compensator included in the receiver, the second training dataset including multiple pairs of: a second input data that represents an output from an optical front end included in the receiver; and a second ground-truth data that represents the transmission symbol sequence, the output from the optical front end being acquired by feeding the transmission symbol sequence to the optical communication system in which the intermediate pre-distortion compensator, the MZM compensator, and the post-distortion compensator are enabled while the pre-distortion compensator is disabled and in which the configuration parameters determined using the first machine learning-based model are applied to the intermediate pre-distortion compensator; and training a third machine learning-based model with a third training dataset to determine configuration parameters of the pre-distortion compensator, the third training dataset including multiple pairs of: a third input data that represents the transmission symbol sequence; and a third ground-truth data that represents an inverse signal of distortion that is generated based on an output from the post-distortion compensator, the output from the post-distortion compensator being acquired by feeding the transmission symbol sequence to the optical communication system in which the pre-distortion compensator and the post-distortion compensator are enabled while the intermediate pre-distortion compensator and the MZM compensator are disabled and in which the configuration parameters determined using the second machine learning-based model are applied to the post-distortion compensator.

(Supplementary Note 7)

The calibration method according to supplementary note 6, wherein the transmitter and the receiver are connected back-to-back when the transmission symbol sequence is fed in to the optical communication system to generate the second training data and the third training data.

(Supplementary Note 8)

The calibration method according to supplementary note 6 or 7, wherein one or more of trainable parameters of the first machine learning-based model are used as the configuration parameters of the intermediate pre-distortion compensator, one or more of trainable parameters of the second machine learning-based model are used as the configuration parameters of the post-distortion compensator, and one or more of trainable parameters of the third machine learning-based model are used as the configuration parameters of the pre-distortion compensator.

(Supplementary Note 9)

The calibration method according to any one of supplementary notes 6 to 8, further comprising:

determining whether or not an update of a configuration of the optical communication system is necessary after the optical communication system transits to an operation phase; and updating the configuration of the optical communication system when it is determined that the update of the configuration of the optical communication system is necessary, wherein the update of the configuration of the optical communication system includes training the third machine learning-based model with the third training dataset to re-determine the configuration parameters of the pre-distortion compensator, the output from the post-distortion compensator to be used to generate the third ground-truth data being acquired by feeding the transmission symbol sequence to the optical communication system in which the pre-distortion compensator and the post-distortion compensator are enabled while the intermediate pre-distortion compensator and the MZM compensator are disabled and in which the transmitter and the receiver are connected through the optical communication channel.

(Supplementary Note 10)

The calibration method according to supplementary note 9, wherein the update of the configuration of the optical communication system further includes training the second machine learning-based model with the second training dataset to re-determine the configuration parameters of the post-distortion compensator, the output from the optical front end to be used to generate the second ground-truth data being acquired by feeding the transmission symbol sequence to the optical communication system in which the pre-distortion compensator and the post-distortion compensator are enabled while the intermediate pre-distortion compensator and the MZM compensator are disabled, in which the transmitter and the receiver are connected through the optical communication channel, and in which the configuration parameters re-determined using the third machine learning-based model are applied to the pre-distortion compensator.

(Supplementary Note 11)

A non-transitory computer-readable storage medium storing a program that causes a computer to execute:

training a first machine learning-based model with a first training dataset to determine configuration parameters of an intermediate pre-distortion compensator in an optical communication system that includes a transmitter, a receiver, and an optical communication channel, the transmitter including a pre-distortion compensator, the intermediate pre-distortion compensator, and a Mach Zehnder Modulator (MZM) compensator, the first training dataset including multiple pairs of: a first input data that represents a transmission symbol sequence representing a message to be sent; and a first ground-truth data that represents an inverse signal of distortion that is generated based on an output from an electrical path in the transmitter, the output from the electrical path being acquired by feeding the transmission symbol sequence to the transmitter in which the intermediate pre-distortion compensator and the MZM compensator are enabled while the pre-distortion compensator is disabled;

training a second machine learning-based model with a second training dataset to determine configuration parameters of the post-distortion compensator included in the receiver, the second training dataset including multiple pairs of: a second input data that represents an output from an optical front end included in the receiver; and a second ground-truth data that represents the transmission symbol sequence, the output from the optical front end being acquired by feeding the transmission symbol sequence to the optical communication system in which the intermediate pre-distortion compensator, the MZM compensator, and the post-distortion compensator are enabled while the pre-distortion compensator is disabled and in which the configuration parameters determined using the first machine learning-based model are applied to the intermediate pre-distortion compensator; and training a third machine learning-based model with a third training dataset to determine configuration parameters of the pre-distortion compensator, the third training dataset including multiple pairs of: a third input data that represents the transmission symbol sequence; and a third ground-truth data that represents an inverse signal of distortion that is generated based on an output from the post-distortion compensator, the output from the post-distortion compensator being acquired by feeding the transmission symbol sequence to the optical communication system in which the pre-distortion compensator and the post-distortion compensator are enabled while the intermediate pre-distortion compensator and the MZM compensator are disabled and in which the configuration parameters determined using the second machine learning-based model are applied to the post-distortion compensator.

(Supplementary Note 12)

The storage medium according to supplementary note 11, wherein the transmitter and the receiver are connected back-to-back when the transmission symbol sequence is fed in to the optical communication system to generate the second training data and the third training data.

(Supplementary Note 13)

The storage medium according to supplementary note 11 or 12, wherein one or more of trainable parameters of the first machine learning-based model are used as the configuration parameters of the intermediate pre-distortion compensator, one or more of trainable parameters of the second machine learning-based model are used as the configuration parameters of the post-distortion compensator, and one or more of trainable parameters of the third machine learning-based model are used as the configuration parameters of the pre-distortion compensator.

(Supplementary Note 14)

The storage medium according to any one of supplementary notes 11 to 13, wherein the program causes the computer to further execute:

determining whether or not an update of a configuration of the optical communication system is necessary after the optical communication system transits to an operation phase; and updating the configuration of the optical communication system when it is determined that the update of the configuration of the optical communication system is necessary, wherein the update of the configuration of the optical communication system includes training the third machine learning-based model with the third training dataset to re-determine the configuration parameters of the pre-distortion compensator, the output from the post-distortion compensator to be used to generate the third ground-truth data being acquired by feeding the transmission symbol sequence to the optical communication system in which the pre-distortion compensator and the post-distortion compensator are enabled while the intermediate pre-distortion compensator and the MZM compensator are disabled and in which the transmitter and the receiver are connected through the optical communication channel.

(Supplementary Note 15)

The storage medium according to supplementary note 14, wherein the update of the configuration of the optical communication system further includes training the second machine learning-based model with the second training dataset to re-determine the configuration parameters of the post-distortion compensator, the output from the optical front end to be used to generate the second ground-truth data being acquired by feeding the transmission symbol sequence to the optical communication system in which the pre-distortion compensator and the post-distortion compensator are enabled while the intermediate pre-distortion compensator and the MZM compensator are disabled, in which the transmitter and the receiver are connected through the optical communication channel, and in which the configuration parameters re-determined using the third machine learning-based model are applied to the pre-distortion compensator.

REFERENCE SIGNS LIST

100 optical communication system
110 transmitter
111 optical transmission unit
112 electrical path
113 digital-to-analog converter
114 driving amplifier
115 Mach Zehnder modulator
116 pre-distortion compensator
117 intermediate pre-distortion compensator
118 MZM compensator
120 receiver
121 optical front end
122 post-distortion compensator
130 communication channel
1000 computer
1020 bus
1040 processor
1060 memory
1080 storage device
1100 input/output interface
1120 network interface
2000 calibration apparatus
2020 first training unit
2040 second training unit
2060 third training unit

What is claimed is:

1. A calibration apparatus comprising:

at least one memory that is configured to store instructions; and at least one processor that is configured to execute the instructions to:

train a first machine learning-based model with a first training dataset to determine configuration parameters of an intermediate pre-distortion compensator in an optical communication system that includes a transmitter, a receiver, and an optical communication channel, the transmitter including a pre-distortion compensator, the intermediate pre-distortion compensator, and a Mach Zehnder Modulator (MZM) compensator, the first training dataset including multiple pairs of: a first input data that represents a transmission symbol sequence representing a message to be sent; and a first ground-truth data that represents an inverse signal of distortion that is generated based on an output from an electrical path in the transmitter, the output from the electrical path being acquired by feeding the transmission symbol sequence to the transmitter in which the intermediate pre-distortion compensator and the MZM compensator are enabled while the pre-distortion compensator is disabled;

train a second machine learning-based model with a second training dataset to determine configuration parameters of the post-distortion compensator included in the receiver, the second training dataset including multiple pairs of: a second input data that represents an output from an optical front end included in the receiver; and a second ground-truth data that represents the transmission symbol sequence, the output from the optical front end being acquired by feeding the transmission symbol sequence to the optical communication system in which the intermediate pre-distortion compensator, the MZM compensator, and the post-distortion compensator are enabled while the pre-distortion compensator is disabled and in which the configuration parameters determined using the first machine learning-based model are applied to the intermediate pre-distortion compensator; and train a third machine learning-based model with a third training dataset to determine configuration parameters of the pre-distortion compensator, the third training dataset including multiple pairs of: a third input data that represents the transmission symbol sequence; and a third ground-truth data that represents an inverse signal of distortion that is generated based on an output from the post-distortion compensator, the output from the post-distortion compensator being acquired by feeding the transmission symbol sequence to the optical communication system in which the pre-distortion compensator and the post-distortion compensator are enabled while the intermediate pre-distortion compensator and the MZM compensator are disabled and in which the configuration parameters determined using the second machine learning-based model are applied to the post-distortion compensator.

2. The calibration apparatus according to claim 1, wherein the transmitter and the receiver are connected back-to-back when the transmission symbol sequence is fed in to the optical communication system to generate the second training data and the third training data.

3. The calibration apparatus according to claim 1, wherein one or more of trainable parameters of the first machine learning-based model are used as the configuration parameters of the intermediate pre-distortion compensator, one or more of trainable parameters of the second machine learning-based model are used as the configuration parameters of the post-distortion compensator, and one or more of trainable parameters of the third machine learning-based model are used as the configuration parameters of the pre-distortion compensator.

4. The calibration apparatus according to claim 1, wherein the at least one processor is configured to execute the instructions further to:

determine whether or not an update of a configuration of the optical communication system is necessary after the optical communication system transits to an operation phase; and update the configuration of the optical communication system when it is determined that the update of the configuration of the optical communication system is necessary, the update of the configuration of the optical communication system includes training the third machine learning-based model with the third training dataset to re-determine the configuration parameters of the pre-distortion compensator, the output from the post-distortion compensator to be used to generate the third ground-truth data being acquired by feeding the transmission symbol sequence to the optical communication system in which the pre-distortion compensator and the post-distortion compensator are enabled while the intermediate pre-distortion compensator and the MZM compensator are disabled and in which the transmitter and the receiver are connected through the optical communication channel.

5. The calibration apparatus according to claim 4, wherein the update of the configuration of the optical communication system further includes training the second machine learning-based model with the second training dataset to re-determine the configuration parameters of the post-distortion compensator, the output from the optical front end to be used to generate the second ground-truth data being acquired by feeding the transmission symbol sequence to the optical communication system in which the pre-distortion compensator and the post-distortion compensator are enabled while the intermediate pre-distortion compensator and the MZM compensator are disabled, in which the transmitter and the receiver are connected through the optical communication channel, and in which the configuration parameters re-determined using the third machine learning-based model are applied to the pre-distortion compensator.

6. A calibration method performed by a computer, comprising:

training a first machine learning-based model with a first training dataset to determine configuration parameters of an intermediate pre-distortion compensator in an optical communication system that includes a transmitter, a receiver, and an optical communication channel, the transmitter including a pre-distortion compensator, the intermediate pre-distortion compensator, and a Mach Zehnder Modulator (MZM) compensator, the first training dataset including multiple pairs of: a first input data that represents a transmission symbol sequence representing a message to be sent; and a first ground-truth data that represents an inverse signal of distortion that is generated based on an output from an electrical path in the transmitter, the output from the electrical path being acquired by feeding the transmission symbol sequence to the transmitter in which the intermediate pre-distortion compensator and the MZM compensator are enabled while the pre-distortion compensator is disabled;

training a second machine learning-based model with a second training dataset to determine configuration parameters of the post-distortion compensator included in the receiver, the second training dataset including multiple pairs of: a second input data that represents an output from an optical front end included in the receiver; and a second ground-truth data that represents the transmission symbol sequence, the output from the optical front end being acquired by feeding the transmission symbol sequence to the optical communication system in which the intermediate pre-distortion compensator, the MZM compensator, and the post-distortion compensator are enabled while the pre-distortion compensator is disabled and in which the configuration parameters determined using the first machine learning-based model are applied to the intermediate pre-distortion compensator; and training a third machine learning-based model with a third training dataset to determine configuration parameters of the pre-distortion compensator, the third training dataset including multiple pairs of: a third input data that represents the transmission symbol sequence; and a third ground-truth data that represents an inverse signal of distortion that is generated based on an output from the post-distortion compensator, the output from the post-distortion compensator being acquired by feeding the transmission symbol sequence to the optical communication system in which the pre-distortion compensator and the post-distortion compensator are enabled while the intermediate pre-distortion compensator and the MZM compensator are disabled and in which the configuration parameters determined using the second machine learning-based model are applied to the post-distortion compensator.

7. The calibration method according to claim 6, wherein the transmitter and the receiver are connected back-to-back when the transmission symbol sequence is fed in to the optical communication system to generate the second training data and the third training data.

8. The calibration method according to claim 6- or 7, wherein one or more of trainable parameters of the first machine learning-based model are used as the configuration parameters of the intermediate pre-distortion compensator, one or more of trainable parameters of the second machine learning-based model are used as the configuration parameters of the post-distortion compensator, and one or more of trainable parameters of the third machine learning-based model are used as the configuration parameters of the pre-distortion compensator.

9. The calibration method according to claim 6, further comprising:

determining whether or not an update of a configuration of the optical communication system is necessary after the optical communication system transits to an operation phase; and updating the configuration of the optical communication system when it is determined that the update of the configuration of the optical communication system is necessary, wherein the update of the configuration of the optical communication system includes training the third machine learning-based model with the third training dataset to re-determine the configuration parameters of the pre-distortion compensator, the output from the post-distortion compensator to be used to generate the third ground-truth data being acquired by feeding the transmission symbol sequence to the optical communication system in which the pre-distortion compensator and the post-distortion compensator are enabled while the intermediate pre-distortion compensator and the MZM compensator are disabled and in which the transmitter and the receiver are connected through the optical communication channel.

10. The calibration method according to claim 9, wherein the update of the configuration of the optical communication system further includes training the second machine learning-based model with the second training dataset to re-determine the configuration parameters of the post-distortion compensator, the output from the optical front end to be used to generate the second ground-truth data being acquired by feeding the transmission symbol sequence to the optical communication system in which the pre-distortion compensator and the post-distortion compensator are enabled while the intermediate pre-distortion compensator and the MZM compensator are disabled, in which the transmitter and the receiver are connected through the optical communication channel, and in which the configuration parameters re-determined using the third machine learning-based model are applied to the pre-distortion compensator.

11. A non-transitory computer-readable storage medium storing a program that causes a computer to execute:

training a first machine learning-based model with a first training dataset to determine configuration parameters of an intermediate pre-distortion compensator in an optical communication system that includes a transmitter, a receiver, and an optical communication channel, the transmitter including a pre-distortion compensator, the intermediate pre-distortion compensator, and a Mach Zehnder Modulator (MZM) compensator, the first training dataset including multiple pairs of: a first input data that represents a transmission symbol sequence representing a message to be sent; and a first ground-truth data that represents an inverse signal of distortion that is generated based on an output from an electrical path in the transmitter, the output from the electrical path being acquired by feeding the transmission symbol sequence to the transmitter in which the intermediate pre-distortion compensator and the MZM compensator are enabled while the pre-distortion compensator is disabled;

training a second machine learning-based model with a second training dataset to determine configuration parameters of the post-distortion compensator included in the receiver, the second training dataset including multiple pairs of: a second input data that represents an output from an optical front end included in the receiver; and a second ground-truth data that represents the transmission symbol sequence, the output from the optical front end being acquired by feeding the transmission symbol sequence to the optical communication system in which the intermediate pre-distortion compensator, the MZM compensator, and the post-distortion compensator are enabled while the pre-distortion compensator is disabled and in which the configuration parameters determined using the first machine learning-based model are applied to the intermediate pre-distortion compensator; and training a third machine learning-based model with a third training dataset to determine configuration parameters of the pre-distortion compensator, the third training dataset including multiple pairs of: a third input data that represents the transmission symbol sequence; and a third ground-truth data that represents an inverse signal of distortion that is generated based on an output from the post-distortion compensator, the output from the post-distortion compensator being acquired by feeding the transmission symbol sequence to the optical communication system in which the pre-distortion compensator and the post-distortion compensator are enabled while the intermediate pre-distortion compensator and the MZM compensator are disabled and in which the configuration parameters determined using the second machine learning-based model are applied to the post-distortion compensator.

12. The storage medium according to claim 11, wherein the transmitter and the receiver are connected back-to-back when the transmission symbol sequence is fed in to the optical communication system to generate the second training data and the third training data.

13. The storage medium according to claim 11, wherein one or more of trainable parameters of the first machine learning-based model are used as the configuration parameters of the intermediate pre-distortion compensator, one or more of trainable parameters of the second machine learning-based model are used as the configuration parameters of the post-distortion compensator, and one or more of trainable parameters of the third machine learning-based model are used as the configuration parameters of the pre-distortion compensator.

14. The storage medium according to claim 11, wherein the program causes the computer to further execute:

determining whether or not an update of a configuration of the optical communication system is necessary after the optical communication system transits to an operation phase; and updating the configuration of the optical communication system when it is determined that the update of the configuration of the optical communication system is necessary, wherein the update of the configuration of the optical communication system includes training the third machine learning-based model with the third training dataset to re-determine the configuration parameters of the pre-distortion compensator, the output from the post-distortion compensator to be used to generate the third ground-truth data being acquired by feeding the transmission symbol sequence to the optical communication system in which the pre-distortion compensator and the post-distortion compensator are enabled while the intermediate pre-distortion compensator and the MZM compensator are disabled and in which the transmitter and the receiver are connected through the optical communication channel.

15. The storage medium according to claim 14, wherein the update of the configuration of the optical communication system further includes training the second machine learning-based model with the second training dataset to re-determine the configuration parameters of the post-distortion compensator, the output from the optical front end to be used to generate the second ground-truth data being acquired by feeding the transmission symbol sequence to the optical communication system in which the pre-distortion compensator and the post-distortion compensator are enabled while the intermediate pre-distortion compensator and the MZM compensator are disabled, in which the transmitter and the receiver are connected through the optical communication channel, and in which the configuration parameters re-determined using the third machine learning-based model are applied to the predistortion compensator.

* * * * *